United States Patent
Barker

(10) Patent No.: US 6,468,695 B1
(45) Date of Patent: Oct. 22, 2002

(54) ACTIVE MATERIAL HAVING EXTENDED CYCLE LIFE

(75) Inventor: Jeremy Barker, Redmond, WA (US)

(73) Assignee: Valence Technology Inc., Henderson, NV (US)

(*) Notice: Subject to any disclaimer, the term of this patent is extended or adjusted under 35 U.S.C. 154(b) by 0 days.

(21) Appl. No.: 09/376,914

(22) Filed: Aug. 18, 1999

(51) Int. Cl.$^7$ ................................................ H01M 4/50
(52) U.S. Cl. ..................................... 429/224; 429/231.1
(58) Field of Search ............................ 429/224, 231.1, 429/49; 423/599

(56) References Cited

U.S. PATENT DOCUMENTS

| | | |
|---|---|---|
| 4,215,188 A | 7/1980 | Saathoff et al. |
| 4,279,972 A | 7/1981 | Moses |
| 4,465,747 A | 8/1984 | Evans |
| 5,168,019 A | 12/1992 | Sugeno |
| 5,192,629 A | 3/1993 | Guyomard et al. |
| 5,294,499 A | 3/1994 | Furukawa et al. .......... 429/164 |
| 5,399,447 A | 3/1995 | Chaloner-Gill et al. |
| 5,419,985 A | 5/1995 | Koksbang |
| 5,427,875 A | 6/1995 | Yamamoto et al. |
| 5,435,054 A | 7/1995 | Tonder et al. |
| 5,443,929 A * | 8/1995 | Yamamoto et al. .......... 429/224 |
| 5,474,858 A | 12/1995 | Merritt ....................... 429/224 |
| 5,482,795 A | 1/1996 | Chaloner-Gill |
| 5,639,438 A | 6/1997 | Ellgen ........................ 423/594 |
| 5,683,835 A | 11/1997 | Bruce |
| 5,693,307 A | 12/1997 | Bowden et al. ............. 423/599 |
| 5,700,597 A * | 12/1997 | Zhong et al. ................ 429/218 |
| 5,705,291 A | 1/1998 | Amatucci et al. ........... 429/137 |
| 5,733,685 A | 3/1998 | Wang |
| 5,753,202 A | 5/1998 | Wang et al. ................. 423/599 |
| 5,783,328 A * | 7/1998 | Wang .......................... 429/137 |
| 5,951,919 A | 9/1999 | Hwang et al. ............. 252/518.1 |

FOREIGN PATENT DOCUMENTS

| | | |
|---|---|---|
| EP | WO 92 20112 | 11/1992 |
| JP | 59 081 870 | 5/1984 |
| JP | 61 165 961 | 7/1986 |
| JP | 04 363 865 | 12/1992 |
| JP | 06 333 598 | 12/1994 |
| JP | 07 235 297 | 9/1995 |
| JP | 7-262984 | 10/1995 |
| JP | 08 321 326 | 12/1996 |
| WO | WO 06/69006 | 11/2000 |

OTHER PUBLICATIONS

Amatucci et al., "Surface treatments of Li1+xMn2−xO4 spinels . . . ", Solid State Ionics, vol.: 104, Issue 1–2, Dec. 1, 1997.*

PCT Search Report PCT/US00/18735.

G. Herlem, B. Fahys, M. Szekely, E. Sutter, C. Mathieu, M. Herlem, and J.F. Penneau, n–Butylamine as Solvent for Lithium Salt Electrolytces, Structure and Properties of Concentrated Solutions, *Electrochimia Acta*, vol. 41, No. 17, pp. 2753–2760, 1996.

* cited by examiner

Primary Examiner—Carol Chaney
(74) Attorney, Agent, or Firm—Roger A. Williams; Cynthia S. Kovacevic

(57) ABSTRACT

In one embodiment, the invention provides a novel composition which is stabilized against decomposition when used as an active material for an electrochemical cell. The active material of the present invention comprises particles of spinel lithium manganese oxide (LMO) enriched with lithium by a decomposition product of lithium hydroxide forming a part of each of the LMO particles. The spinel LMO product formed by the decomposition of lithium hydroxide in the presence of the LMO is characterized by a reduced surface area and increased capacity retention (reduced capacity fading) as compared to the initial, non-treated, non-enriched spinel. In another aspect, the treated spinel LMO product is combined with lithium carbonate in a cathode mixture.

22 Claims, 6 Drawing Sheets

ACTIVE MATERIAL HAVING EXTENDED CYCLE LIFE

FIELD OF THE INVENTION

This invention relates to electrochemical cells and batteries, and more particularly, to such cells and batteries having lithium-based active material.

BACKGROUND OF THE INVENTION

Lithium batteries are prepared from one or more lithium electrochemical cells. Such cells have included an anode (negative electrode), a cathode (positive electrode), and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous rechargeable lithium battery in which lithium metal is replaced with a material capable of reversibly intercalating lithium ions, thereby providing the "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art.

Preferred positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, prepared by reacting generally stoichiometric quantities of a lithium-containing compound and a manganese containing compound. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because less than 1 atomic unit of lithium engages in the electrochemical reaction. Such an initial capacity value is significantly diminished during the first cycle operation and such capacity further diminishes on every successive cycle of operation. The specific capacity for $LiMn_2O_4$ is at best 148 milliamp hours per gram. As described by those skilled in the field, the observed reversible capacity is on the order of 60% of the aforesaid value. Obviously, there is a tremendous difference between the theoretical capacity (assuming all lithium is extracted from $LiMn_2O_4$) and the actual capacity when much less than one atomic unit of lithium is extracted as observed during operation of a cell. For the metal oxides listed above, only about 0.5 atomic units of lithium is reversibly cycled during cell operation. Thus, the presently known and commonly used, alkali transition metal oxide compounds suffer from relatively low capacity. Therefore, there remains the difficulty of obtaining a lithium-containing chalcogenide electrode material having acceptable capacity without disadvantage of significant capacity fading (loss) when used in a cell.

Capacity fading is well known and is calculated according to the equation given below. The equation is used to calculate the first cycle capacity loss. This same equation is also used to calculate subsequent progressive capacity loss during subsequent cycling relative back to the first cycle capacity charge reference.

((FC charge capacity)−(FC discharge capacity))×100% FC charge capacity

In view of the present state of the art, there remains the difficulty of obtaining lithium manganese oxide based electrode materials having the attractive capacity of the basic spinel $Li_xMn_2O_4$ intercalation compound, but without its disadvantage of significant capacity loss on progressive cycling.

SUMMARY OF THE INVENTION

In one embodiment, the invention provides a novel composition which is stabilized against decomposition when used as an active material for an electrochemical cell. Problems observed with degradation and decomposition of active material have been described in co-pending applications Ser. No. 09/307,335, filed May 7, 1999, and in then co-pending PCT/US97/22525, filed Nov. 21, 1997, and in then co-pending U.S. Ser. No. 08/762,081, filed Dec. 9, 1996, now U.S. Pat. No. 5,869,207, in the names of J. Barker, Y. Saidi, and C. S. Kelley and assigned to the assignee of the present invention. The active material of the present invention comprises particles of spinel lithium manganese oxide (LMO) enriched with lithium by a decomposition product of a lithium-containing compound. This lithium-containing compound meets three criteria: (1) it is lithium-containing; (2) decomposable at low enough temperature to release Li and not cause oxygen deficiency from the LMO; and (3) does not contain potentially harmful contaminants to the LMO performance (e.g., transition metals). Desirable compounds are, for example, lithium acetate ($LiC_2H_3O_2$), lithium oxalate ($Li_2C_2O_4$), lithium formate (LiOOCH), and lithium tartrate ($Li_2C_4H_4O_6$). The most preferred compound is lithium hydroxide. The decomposition product forms a part of each of the LMO particles. The spinel LMO product formed by the decomposition of lithium containing compound in the presence of the LMO is characterized by a reduced surface area and increased capacity retention (reduced capacity fading) as compared to the initial, non-treated, non-enriched spinel.

In one aspect, the spinel LMO product is a reaction product of the LMO particles and the lithium containing compound. The lithium-rich spinel so prepared is represented by the formula $Li_{1+y}Mn_{2-y}O_4$, where y is greater than zero and less than or equal to 0.20. Preferably, the lithium-enriched spinel LMO product has y greater than or equal to 0.08. The character of the product is further defined below. This lithium-rich spinel product is preferably prepared from an LMO starting material of the formula $Li_{1+x}Mn_{2-x}O_4$, where in the starting material has a value of x greater than zero and less than or equal to 0.08. Preferably the starting material before enrichment has a value of x greater than 0.05. The lithium-rich spinel product $Li_{1+y}Mn^{2-y}O_4$, has a lithium content greater than that of the $Li_{1+x}Mn_{2-x}O_4$ starting material.

Obviously, if all the lithium containing compound is decomposed or reacted, then the lithium-enriched spinel is produced. If some of the lithium containing compound remains unreacted or not decomposed, then presumably it is dispersed or adhered to the surface of the spinel particles. In the preferred embodiment, essentially all of the lithium containing compound is decomposed, and the lithium forms a part of the LMO product. The preferred embodiment will be described with reference to the preferred lithium hydroxide compound.

In one embodiment, the invention provides a method of treating spinel lithium manganese oxide particles which first comprises forming a mixture of the lithium manganese oxide particles and lithium hydroxide. Next, the mixture is heated for a time and in a temperature sufficient to decompose at least a portion of, and preferably all of, the lithium hydroxide in the presence of the lithium manganese oxide. Depending on the temperature selected, a portion of the lithium hydroxide is decomposed or reacted.

The result is a treated spinel lithium manganese oxide $Li_{1+y}Mn_{2-y}O_4$ characterized by reduced surface area and increased lithium content as compared to an untreated spinel lithium manganese oxide $Li_{1+x}Mn_{2-x}O_4$ where y is greater than x.

In one aspect, the aforesaid heating to decompose the lithium hydroxide is conducted in a static (i.e., non-flowing) air atmosphere or in a flowing air atmosphere. In another alternative, it is conducted in inert (e.g., nitrogen) atmosphere since the LMO would not lose oxygen at the temperature required for the Li incorporation reaction (e.g., 400° C.). The heating is conducted for a time of up to about 5 hours and the amount of lithium hydroxide contained in the mixture, is up to about 10%, and desirably up to about 5% by weight of the total mixture. This weight percent is based on the lithium hydroxide being first air dried since it is somewhat hydroscopic and it is preferred to evaporate any water. Preferably, the amount of anhydrous lithium hydroxide in the mixture is on the order of 1.2 weight percent with the balance being the LMO. The process of, the invention can utilize either anhydrous LiOH, or LiOH $H_2O$ (monohydrate). The monohydrate is the stable hydrate formed. If using the monohydrate, obviously a change has to be made to the weight of reactant used to compensate for the $H_2O$ content.

In one alternative, essentially all of the lithium hydroxide is decomposed or reacted with the lithium manganese oxide. Then, the lithium-enriched spinel manganese oxide particles are combined with lithium carbonate particles to form a cathode mixture having further improved performance even beyond that of the lithium-enriched spinel. It is preferred that the heat-treated lithium-enriched spinel in particle form is mixed with lithium carbonate in particle form. This preferred particle mixture is used to form an electrode. The electrode comprises the particle mixture, a binder, and optionally conductive materials such as carbon powder.

Objects, features, and advantages of the invention include an improved electrochemical cell or battery based on lithium which has attractive charging and discharging characteristics; a good discharge capacity; and which maintains its integrity over many cycles as compared to presently used cells.

These and other objects, features, and advantages will become apparent from the following description of the preferred embodiments, claims, and accompanying drawings.

BRIEF DESCRIPTION OF THE DRAWINGS

FIG. 5 is a two-part graph showing the results of testing comparative cells. The cells had graphite anode active material and the positive electrode composition is as stated below, based on lithium manganese oxide. The cell charge and discharge are at C/5 and C/2, between 3.0 and 4.2 volts for up to 100 cycles. The cells were cycled at 60° C. with a 2 hour discharge rate C/2 and a 5 hour charge rate C/5, and an additional potentiostatic period at 4.2 volts until current drops to 10% of C/5 rate. FIG. 5A is Coulombic Efficiency and 5B is Discharge Capacity, each Versus Cycles.

DETAILED DESCRIPTION OF THE PREFERRED EMBODIMENTS

Figure 1A:
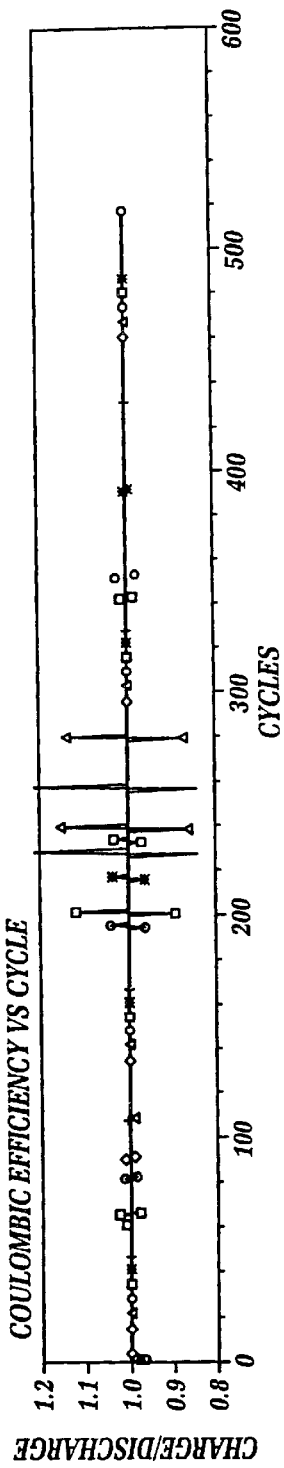
FIG. 1A is Coulombic Efficiency and 1B is Discharged Capacity, each versus Cycles. The cells were cycled between about 3 and 4.2 volts for up to 500 cycles. The cells were cycled at 23° C., 45° C., and 60° C., with a two hour discharge rate (C/2) and a two hour charge rate (C/2); and an additional potentiostatic period at 4.2 volts until current drops to 10% of the C/2 rate. The geometric surface area of the positive electrode was about 180 square centimeters.

In one aspect of the invention, treated lithium manganese oxide is obtained essentially as a result of the thermal decomposition of a lithium containing compound on the lithium manganese oxide. Preferably, this is accomplished by heating a mixture of lithium manganese oxide and lithium hydroxide at an elevated temperature. It is believed that the treated lithium manganese oxide made in accordance with the invention differs fundamentally from lithium manganese oxide known in the art. This difference is reflected in the treated lithium manganese oxide's distinguished electrochemical performance in a cell and also distinguished by the process by which the treated lithium manganese oxide is prepared.

Before further describing the invention, it is useful to understand the characteristics of untreated lithium manganese oxide. The nominal general formula $LiMn_2O_4$ represents a narrow range of spinel lithium manganese oxide compounds (referred to as LMO) which have stoichiometry that varies somewhat in the relative proportion of lithium, manganese and oxygen, but still having the spinel structure. Oxygen deficient spinels are not favored here. The invention provides relatively lithium-rich spinels. This is in contrast to relatively lithium deficient spinels of the formula $Li_{1-x}Mn_2O_4$ which are not favored here. An example of such lithium deficient spinels may be found in U.S. Pat. No. 5,443,929. In contrast to '929, and according to the invention, the lithium manganese oxide material before treatment is represented by $Li_{1+x}Mn_{2-x}O_4$ where $0<x\leq0.08$. Preferably, x is 0.02 to 0.08 before treatment. After treatment, the lithium-rich spinels of the present invention have composition represented by the spinel formula $Li_{1+y}Mn_{2-y}O_4$ where y is greater than zero and up to about 0.5. Also, the value of y in the treated material (spinel product) is greater than the starting value of x in the untreated spinel.

The lithium manganese oxide starting material for treatment must have a suitably high surface area and the ability to be treated with the preferred thermally decomposed lithium hydroxide. It is desirable in the preparation of the treated LMO according to the invention, that the surface area of the starting LMO is between about 0.3 and about 2 $m^2/g$ and that the range of composition would be lithium content $Li_{1+x}$, where x is about 0.02 to about 0.08.

In the experiments below, a spinel lithium manganese oxide was used as a starting material and had a surface area of about 0.9 $m^2/g$ (meter square per gram); average particle size of about 30 microns; lithium content of about 4.1%, corresponding to approximately $Li_{1.08}$; less than 0.1 percent impurities and an x-ray diffraction derived lattice constant, a, parameter of 8.22 Å.

In the process for the preparation of the treated LMO according to the invention, a mixture containing the preferred lithium hydroxide and the LMO is used. In a preferred embodiment of the invention, the mixture is prepared simply by mechanically mixing a powder form of lithium hydroxide and a powder form of the LMO. The mixture can also be obtained by adding to the LMO a solution or suspension of the lithium hydroxide in a suitable solvent. Thereafter, the solvent is removed from the resulting mixture by heating, simple evaporation or other equivalent means known in the art. Suitable solvents include water or alcohol, such as methanol, ethanol, and the like.

Lithium hydroxide used to treat the spinel is known to be hydroscopic. This means that about one atomic unit of water will accompany each atomic unit of lithium hydroxide. Therefore, it is preferred to pre-dry the lithium hydroxide in air at a temperature of about 200° C. for up to about sixteen hours. This yields an essentially anhydrous form of lithium hydroxide which is most preferred for the method of the invention.

In the above-described mixture containing the preferred lithium hydroxide and the LMO, the amount of lithium hydroxide is desirably from 0.1 to 10 percent by weight, more desirably from 0.5 to 5, and preferably 1.2 percent by weight of the mixture, with the LMO constituting the balance.

The prepared mixture containing the lithium hydroxide (LiOH) and the LMO is subjected to heating. This heating step is carried out at a temperature high enough to initiate the decomposition of the lithium hydroxide on the surface of the individual particles of the LMO. Preferably, the temperature is high enough to essentially completely decompose the lithium hydroxide, leaving behind a lithium-enriched spinel. The heating temperature is below the temperature at which the LMO will be decomposed and the heating temperature is below the melting point of the LMO. Importantly, the temperature is also below the temperature where LMO would lose oxygen from the lattice. In this regard, high temperature decomposition compounds such as lithium carbonate are not favored. Heating is conducted for a duration of time sufficient to thermally decompose the lithium hydroxide onto the LMO.

In the method of the invention, the heating step is conveniently performed at a temperature in the range of about 300 to 500° C.; desirably about 300° to about 450° C.; and preferably in a range of about 375 to 450° C.; most preferably at about 425° C. The heating step is conveniently conducted in a suitable atmosphere such as ambient air. Special atmospheres are not required. Advantageously, special conditions such as vacuum, inert or oxygen content control are not needed. Preferably, the heating is conducted for at least 1 minute (time) and up to 10 hours (time). It was found that heating at about 425° C. for about one hour produced good results.

A range of heating times and temperatures are useable to obtain a desired surface area reduction which indicates the desired Li-enriched LMO spinel product has been obtained. Thus, the heating is carried out for a time and at a temperature sufficient to cause a surface-area-reducing effect on the LMO. It is believed that this surface area reduction is a unique characteristic of the treatment method of the invention and is at least, in part, characteristic which guides those skilled in the art in the method of preparation.

Positive electrode active materials were prepared and tested to determine physical, chemical and electrochemical features. The results are reported in FIGS. 1 to 4. Comparative data is given in FIG. 5. Typical cell configurations will be described with reference to FIGS. 6 and 7.

Figure 6:
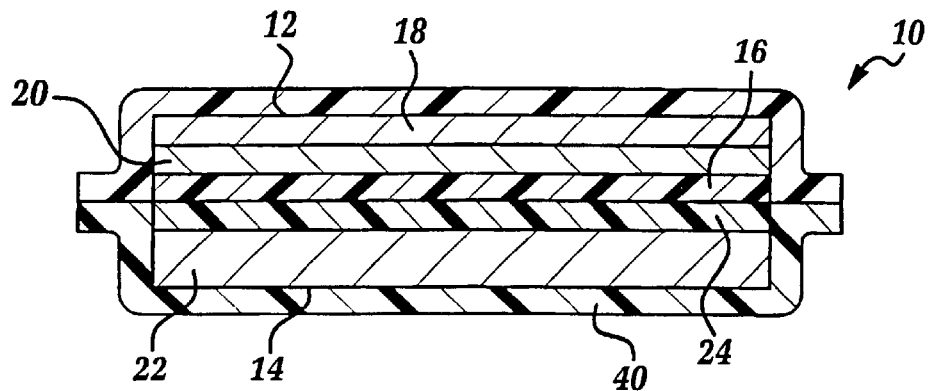
FIG. 6 is a diagrammatic representation of a typical laminated lithium-ion battery cell structure.

A typical laminated battery cell structure 10 is depicted in FIG. 6. It comprises a negative electrode side 12, a positive electrode side 14, and an electrolyte/separator 16 there between. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

Figure 7:
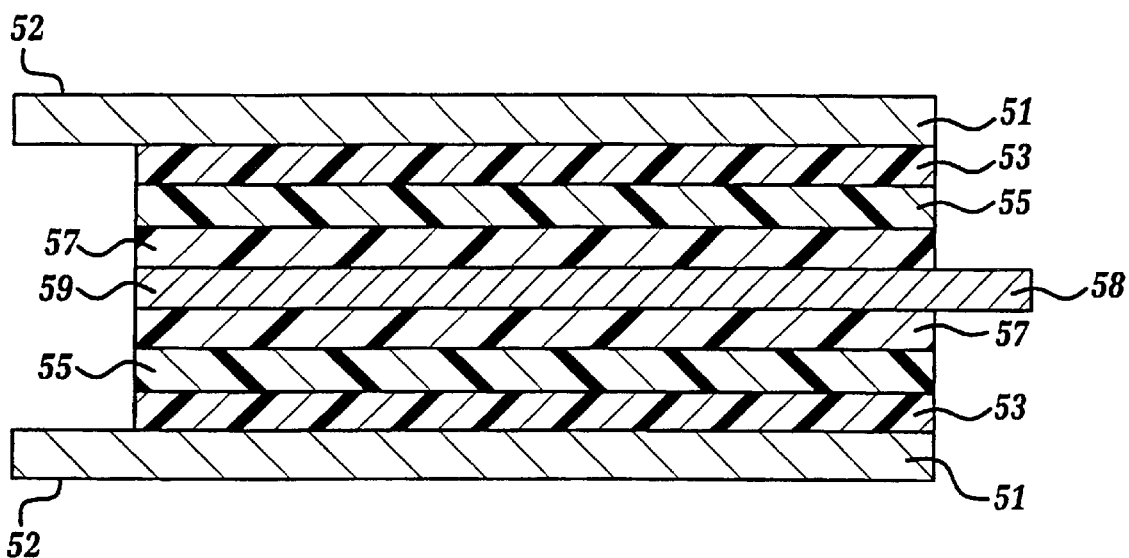
FIG. 7 is a diagrammatic representation of a typical multi-cell battery cell structure.

In another embodiment, a multicell battery configuration as per FIG. 7 is prepared with copper current collector 51, negative electrode 53, electrolyte/separator 55, positive electrode 57, and aluminum current collector 59. Tabs 52 and 58 of the current collector elements form respective terminals for the battery structure.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–95 weight percent. The negative electrode comprises about 50–95% by weight of a preferred graphite, with the balance constituted by the binder. A typical electrolyte separator film comprises approximately two parts polymer for every one part of a preferred fumed silica. The conductive solvent comprises any number of suitable solvents and salts. Desirable solvents and salts are described in U.S. Pat. Nos. 5,643,695 and 5,418,091. One example is a mixture of EC:DMC:LiPF$_6$ in a weight ratio of about 60:30:10.

Solvents are selected to be used individually or in mixtures, and include dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. The salt content ranges from 5% to 65% by weight, preferably from 8% to 35% by weight.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as LiMn$_2$O$_4$ (LMO), LiCoO$_2$, or LiNiO$_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components Iare then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, intercalation electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell which utilizes the novel active material of the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells are often fabricated using lithium metal electrodes. When forming cells for use as batteries, it is preferred to use an intercalation metal oxide positive electrode and a graphitic carbon negative electrode. In the examples below, all test cells contained graphitic carbon active materials. None of the carbon anodes were prelithiated prior to assembly in a cell. Various methods for fabricating electrochemical cells and batteries and for forming electrode components are described herein. The invention is not, however, limited by any particular fabrication method.

EXAMPLE I

As a starting material, lithium manganese oxide spinel (LMO) was obtained from Japan Energy Corporation (JEC) having the specifications as per Table 1, and designated Japan Energy Corporation ISR140B. The method used to make all the treated LMO in the below examples is as per the following steps. First, 200 grams of $LiOH \cdot H_2O$ was pre-dried in air at about 200° C. for about 16 hours. This yielded about 114 grams of anhydrous LiOH. The LMO and dried lithium hydroxide were mixed together by ball milling for about 60 minutes. Here a low level (1–2 weight percent) of dried lithium hydroxide having particle size of about 10 micron was used. The ball milling was conveniently accomplished in a container using zirconia medium. The preferred weight proportions are 98.8 weight percent of LMO and 1.2 weight percent dried LiOH. The LiOH is available from a number of vendors including Alfa Aesar, Aldrich. Since relatively large ceramic media was used for the mixing, there was essentially no attrition of the material. The media was then removed from the mixture. The mixed LiOH/LMO was heated in a furnace set at about 425° C. for about one hour. Treated material was removed from the furnace and allowed to cool in air. The material so treated was used in a cathode formulation.

The heat treated LMO was used to formulate a cathode electrode. The electrode was fabricated by solvent casting a slurry of the treated, enriched lithium manganese oxide, conductive carbon, binder, plasticizer and solvent. The conductive carbon used was Super P (MMM Carbon). Kynar Flex 2801® was used as the binder along with a plasticizer and electronic grade acetone was used as a solvent. The preferred plasticizer was dibutyl phthalate (DPB). The slurry was cast onto glass and a free-standing electrode was formed as the solvent was evaporated. The cathode electrode composition was approximately as follows on a percent basis: 72.8 treated LMO; 3.0 carbon; 7.5 binder; and 16.7 plasticizer. In a preferred method according to the invention, prior to cell construction the plasticizer is extracted. Thus, on this basis the proportions are as follows on a percent basis: 87.4 treated LMO; 3.6 Super P carbon; and 9.0 Kynar binder.

EXAMPLE II

Another cathode electrode was fabricated using the treated LMO of the above Example I and along with a lithium carbonate ($Li_2CO_3$) additive in particle form. In this case, the cathode was fabricated as described above except that lithium carbonate was added to the formulation which was cast to form the electrode. In this case, the cathode electrode coating composition was approximately as follows on a percent basis: 72.6 treated LMO; 3.0 carbon; 7.5 binder; 0.3 $Li_2CO_3$; and 16.7 plasticizer. On an extracted basis, this corresponds to 87.0 treated LMO; 3.6 Super P carbon; 0.4 $Li_2CO_3$; and 9.0 Kynar binder.

A graphite counter electrode was prepared for use with the aforesaid cathode. The graphite counter electrode served as the anode in the electrochemical cell. The graphite electrode was fabricated by solvent casting a slurry of MCMB2528 graphite, binder, plasticizer, and casting solvent. MCMB2528 is a mesocarbon microbead material supplied by Alumina Trading, which is the U.S. distributor for the supplier, Osaka Gas Company of Japan. This material has a density of about 2.24 grams per cubic centimeter; a particle size maximum for at least 95% by weight of the particles of 37 microns; median size of about 22.5 microns and an interlayer distance of about 0.336. The binder was a copolymer of polyvinylidene difluoride (PVdF) and hexafluoropropylene (HFP) in a wt. ratio of PVdF to HFP of 88:12. This binder is sold under the designation of Kynar Flex 2801®, showing it's a registered trademark. Kynar Flex is available from Atochem Corporation. An electronic grade solvent was used. The slurry was cast onto glass and a free standing electrode was formed as -the casting solvent evaporated. The electrode composition was approximately as follows on a dry weight basis: 70 graphite; 9.5 binder; 17.5 plasticizer and 3.0 conductive carbon.

A rocking chair battery was prepared comprising the anode, the cathode, and an electrolyte. The ratio of the active cathode mass to the active anode mass was about 2.6:1. The two electrode layers were arranged with an electrolyte layer in between, and the layers were laminated together using heat and pressure as per the Bell Comm. Res. patents incorporated herein by reference earlier. In a preferred method, the cell is activated with EC/DMC solvent in a weight ratio of 2:1 in a solution containing 1 M $LiPF_6$ salt.

TABLE I

| | BEFORE | TREATED LMO[1] |
| --- | --- | --- |
| Surface Area/m²/g | 0.85 | 0.68 |
| d10 | 10.7 | 10.4 |
| d50 volume % | 31.1 | 31.0 |
| d97 | 69.8 | 68.7 |
| Li content/wt % | 4.05 | 4.34 |
| Lattice Constant a (Å) | 8.2158 | 8.209 |
| Residual LiOH | 0 | 0 |
| Oxygen Deficiency | 0 | 0 |
| Color | Grey/Black | Grey/Black |
| | x in $Li_{1+x}Mn_{2-x}O_4$ (from XRD before) | y in $Li_{1+y}Mn_{2-y}O_4$ (from XRD after) |
| | 0.086 | 0.120 |

*XRD = x-ray diffraction
[1]Treated LMO prepared by heating 98.8 weight percent LMO and 1.2 wt. % LiOH at 425° C. for one hour.

Figure 1B:
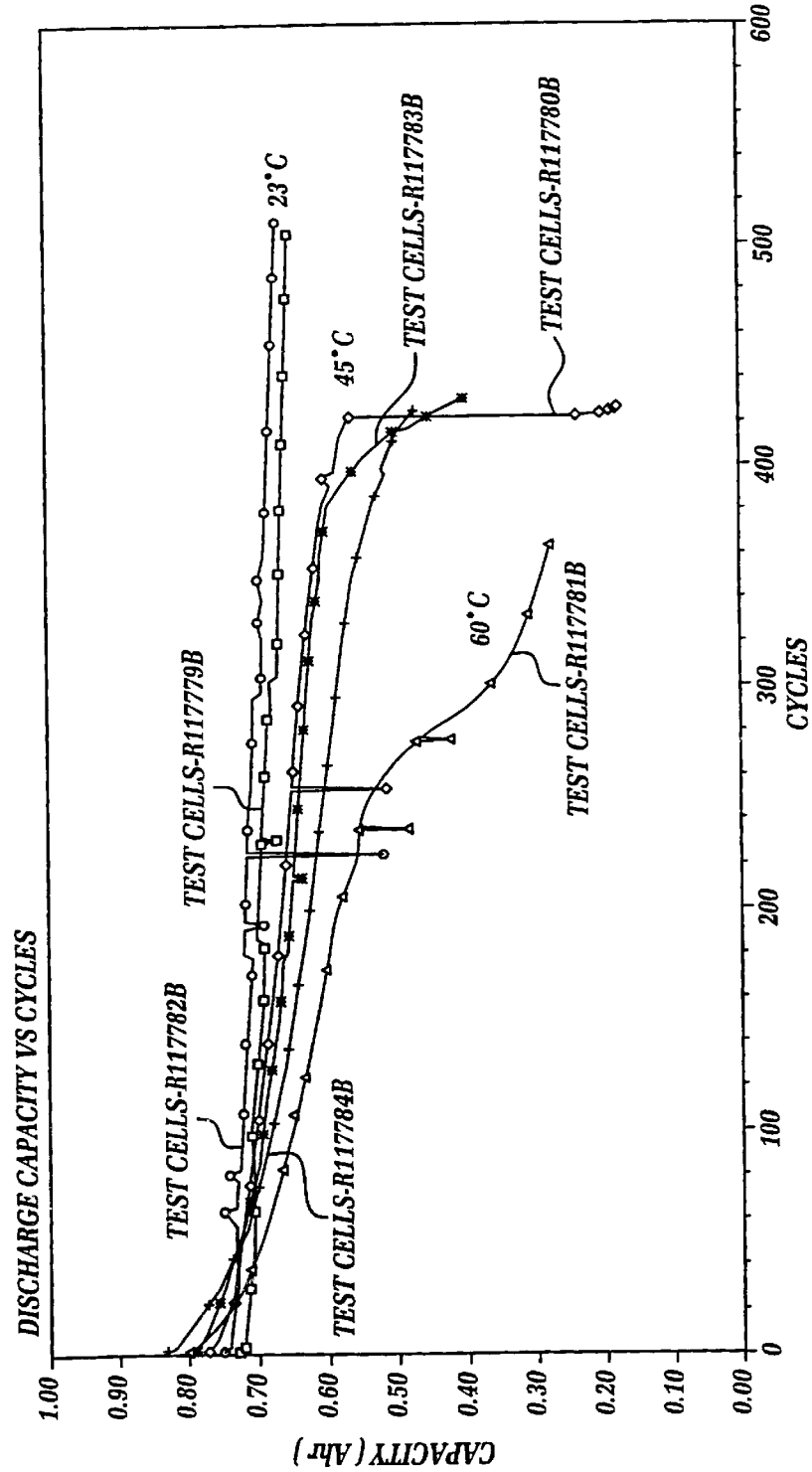
FIG. 1 is a two-part graph showing the results of testing cells, rocking chair batteries, having an anode comprising MCMB active material cycled, with a counter-electrode comprising treated lithium manganese oxide active material as per the Examples presented herein.

FIG. 1 is a two-part graph. The cell of FIG. 1 contains the LMO spinel product of heat treatment with the lithium hydroxide. FIG. 1A (charge capacity/discharge capacity) shows Coulombic Efficiency (recharge ratio) and FIG. 1B shows cyclability and discharge capacity of the cell prepared in accordance with Example I. The capacity was determined at constant current cycling for up to about 500 cycles consistent with the test parameters described above. Cycling was conducted versus graphite anode at two hour discharge (C/2) and two hour charge (C/2), plus potentiostatic float previously defined, at three temperatures, 23° C., 45° C., and 60° C. FIG. 1 shows long cycle life demonstrated by the relatively slow capacity fade versus cycle number for the cells cycled at 23° C. The recharge ratio data shows the absence of any appreciable side reactions or degradation over extended life cycling. This can be more particularly seen from FIG. 1A. The recharge ratio maintains its value exceptionally close to one. The cell at 23° C. maintains over 96% of its capacity over extended cycling to 100 cycles; over 94% of its capacity to 200 cycles; and over 92% of its capacity at about 500 cycles. The combination of slow, minimal capacity fade along with excellent recharge ratio demonstrates the absence of any appreciable side reactions. At 23° C., cells cycled with minimal capacity fade. As expected, cells cycled at 45° C. and 60° C. did not perform as well as the cells cycled at 23° C.

Figure 2A:
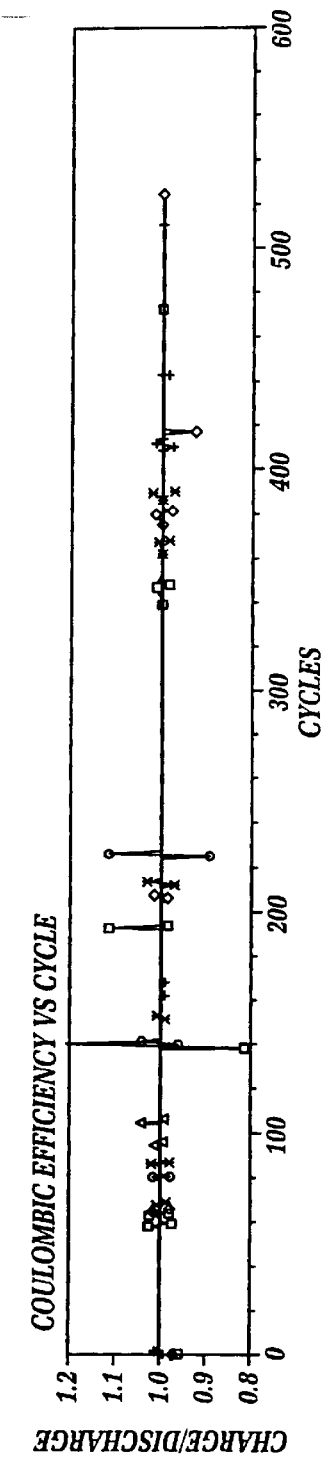
FIG. 2 contains data for another group of cells similar to FIG. 1, except that in these cells the positive electrode also contained particles of lithium carbonate along with the treated lithium manganese oxide. All other conditions were the same.
Figure 2B:
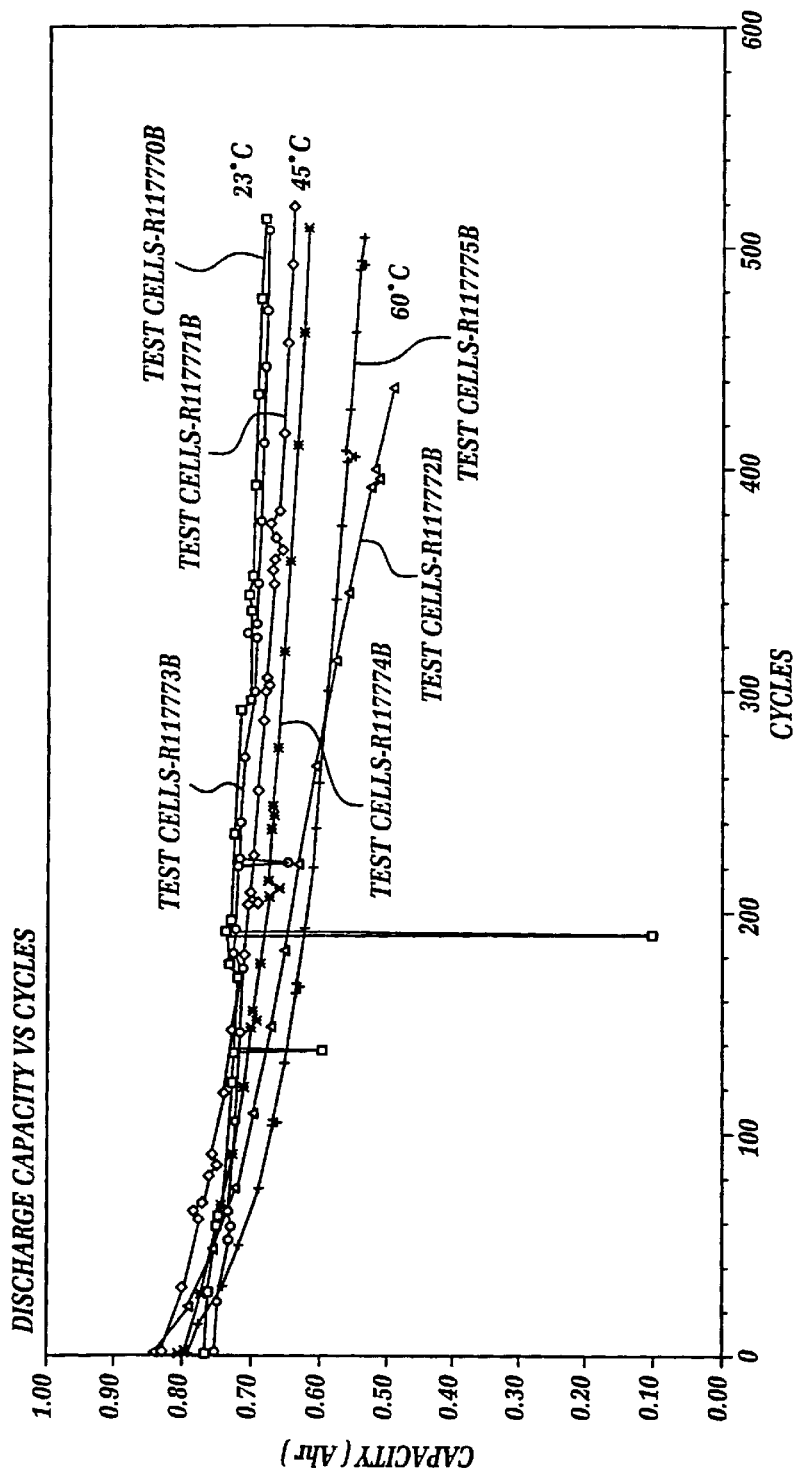

FIG. 2 is a two-part graph. The cell of FIG. 2 contains the LMO heat treated with lithium hydroxide and used to form a cathode which further included particles of lithium carbonate as per Example II. FIG. 2A shows rechargeability and FIG. 2B shows cyclability and capacity of the cell prepared in accordance with Example II. The capacity was determined at constant current cycling for up to 500 cycles at 23° C., 45° C., and 60° C. versus graphite anode at C/2 charge and discharge rates. The results of FIG. 2 demonstrate an improvement over that of FIG. 1. This indicates that the heat treated LMO, combined in a cathode mixture with lithium carbonate, has dramatically improved results particularly when cycled at 45° C. and 60° C. Most of the cells, even at the higher temperatures, were capable of cycling even after 500 cycles. The test was terminated after 500 cycles.

The cells cycled at 23° C. maintained over 95% of its capacity to 100 cycles; over 96% of its capacity to 200 cycles; and over 91% of its capacity at about 500 cycles.

The cells cycled at 45° C. maintained over 95% of its capacity to 100 cycles; over 90% of its capacity to 200 cycles; and over 79% of its capacity at about 500 cycles. The recharge ratio maintained its value close to one in all cases.

The cells cycled at 60° C. maintained 84% capacity after 100 cycles; 79% capacity after 200 cycles, and 67% capacity after 500 cycles.

Figure 3A:
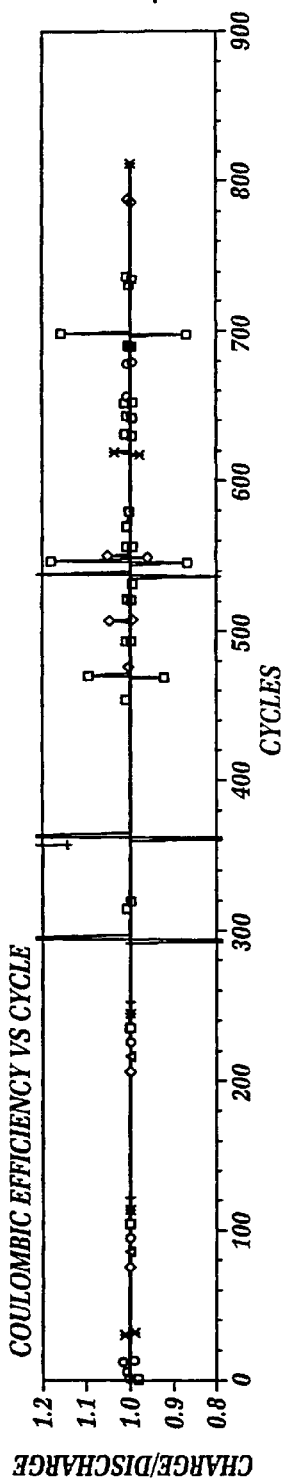
FIG. 3A is Coulombic Efficiency and 3B is Discharged Capacity, each versus Cycles. The cells were cycled between about 3 and 4.2 volts for up to 500 cycles. The cells were cycled at 23° C., 45° C., and 60° C., with a two hour discharge rate (C/2) and a two hour charge rate (C/2). The geometric surface area of the positive electrode was about 180 square centimeters.
Figure 3B:
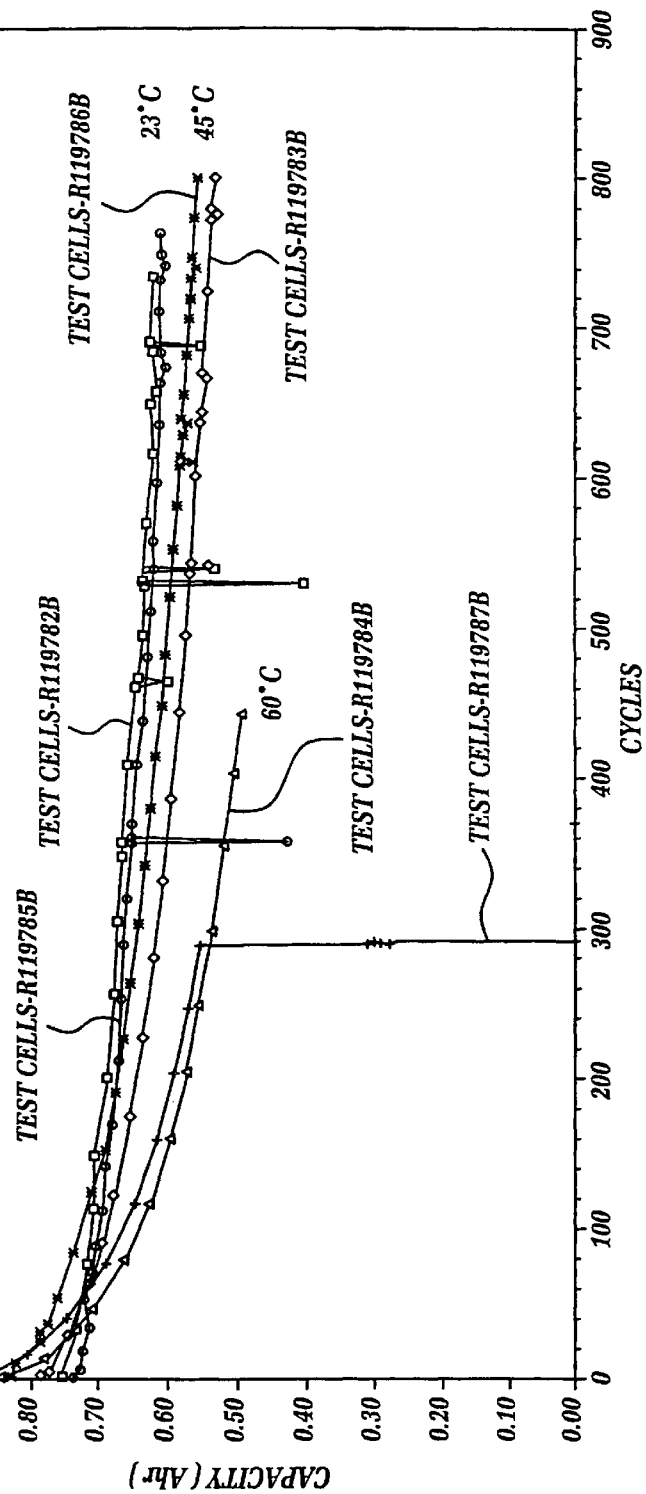
FIG. 3 is a two-part graph showing the results of testing another group of cells, rocking chair batteries, having an anode (negative electrode) comprising MCMB active material cycled with a positive electrode comprising treated lithium manganese oxide active material as per the Examples presented herein.

Additional groups of cells were prepared in accordance with the method of Example I, that is, LMO heat treated with lithium hydroxide in accordance with the method of Example I, and cycled at 23° C., 45° C. and 60° C., in accordance with the method described with respect to Example I. FIG. 3 shows the result of this testing. At 23° C. the capacity retained is as follows, 97% (100 cycles), 93% (200 cycles), and 89% (500 cycles). At 45° C. the capacity retained is 90% (100 cycles), 82% (200 cycles), and 73% (500 cycles). At 60° C. the capacity retained is 79% (100 cycles) and 70% (200 cycles).

Figure 4A:
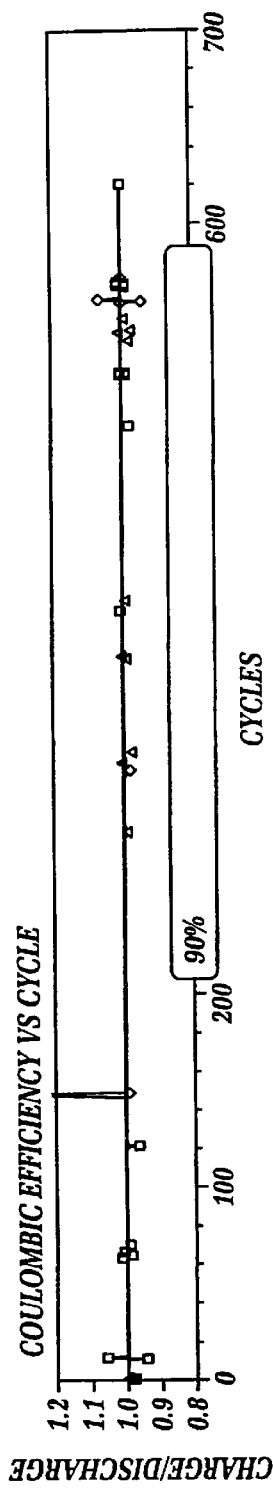
FIG. 4 contains data for another group of cells similar to FIG. 3 except that positive electrode also contained particles of lithium carbonate along with the treated lithium manganese oxide. All other conditions were the same.
Figure 4B:
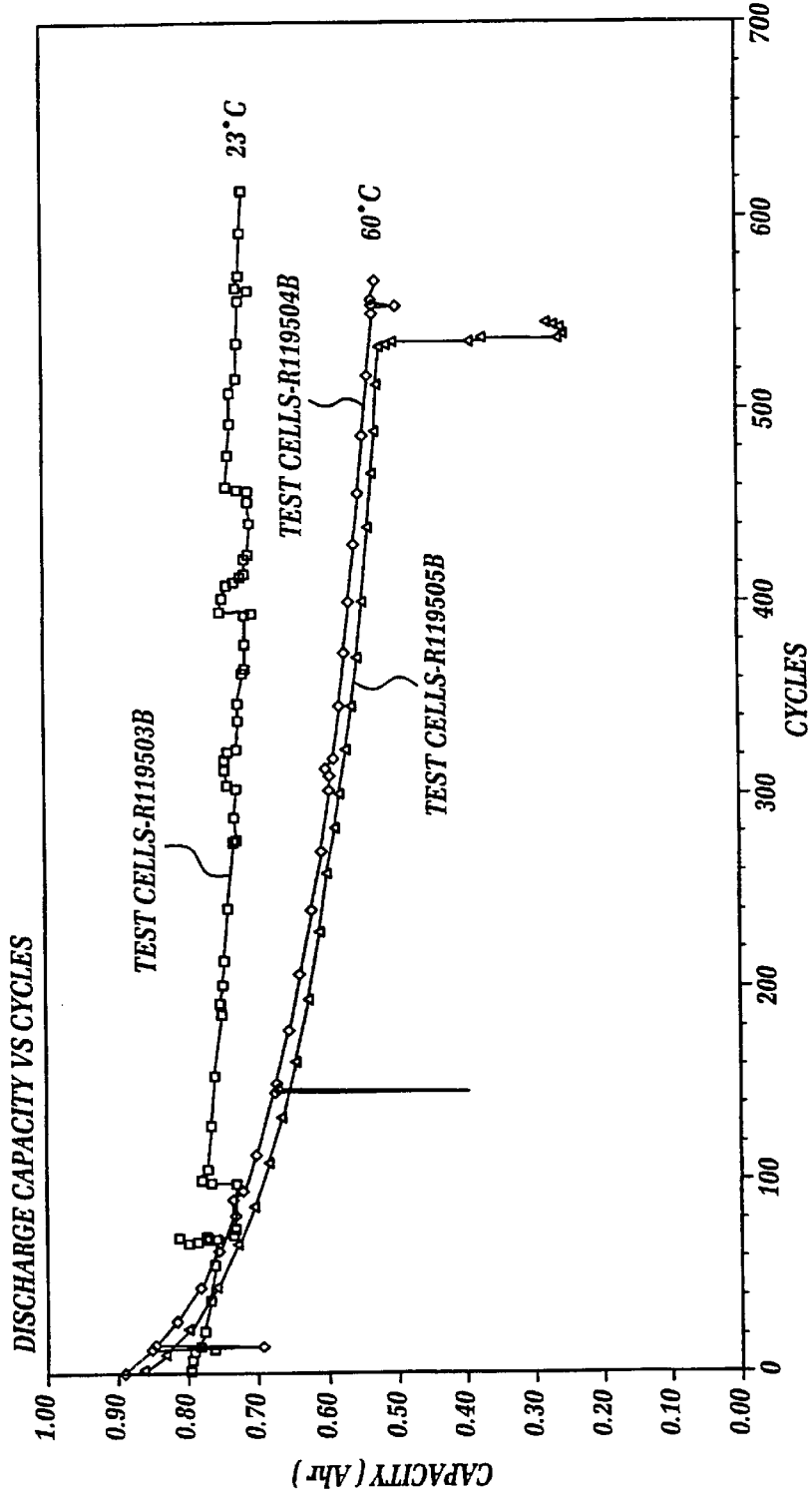

Further cells were prepared in accordance with the method of Example II, that is, with LMO treated with LiOH, and then combined with particles of lithium carbonate to form cathodes. These cells were cycled at 23° and 60° C. The results are shown in FIG. 4. At 23° C. the capacity retained is 96% (100 cycles), 93% (200 cycles), and 91% (500 cycles). At 60° C. the capacity retained is 80% (100 cycles), 73% (200 cycles), and 63% (500 cycles).

Figure 5A:
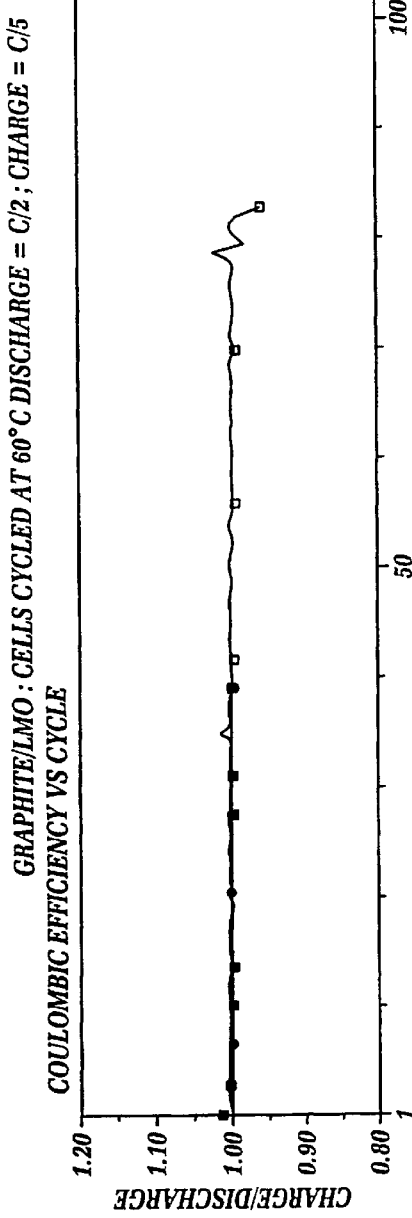
In FIGS. 5A and 5B, the data for the cells are labeled according to the positive electrode composition and are as follows: (a) surface modified (treated) LMO treated with lithium carbonate; (b) untreated LMO with $Li_2CO_3$ particulate; and (c) untreated LMO.
Figure 5B:
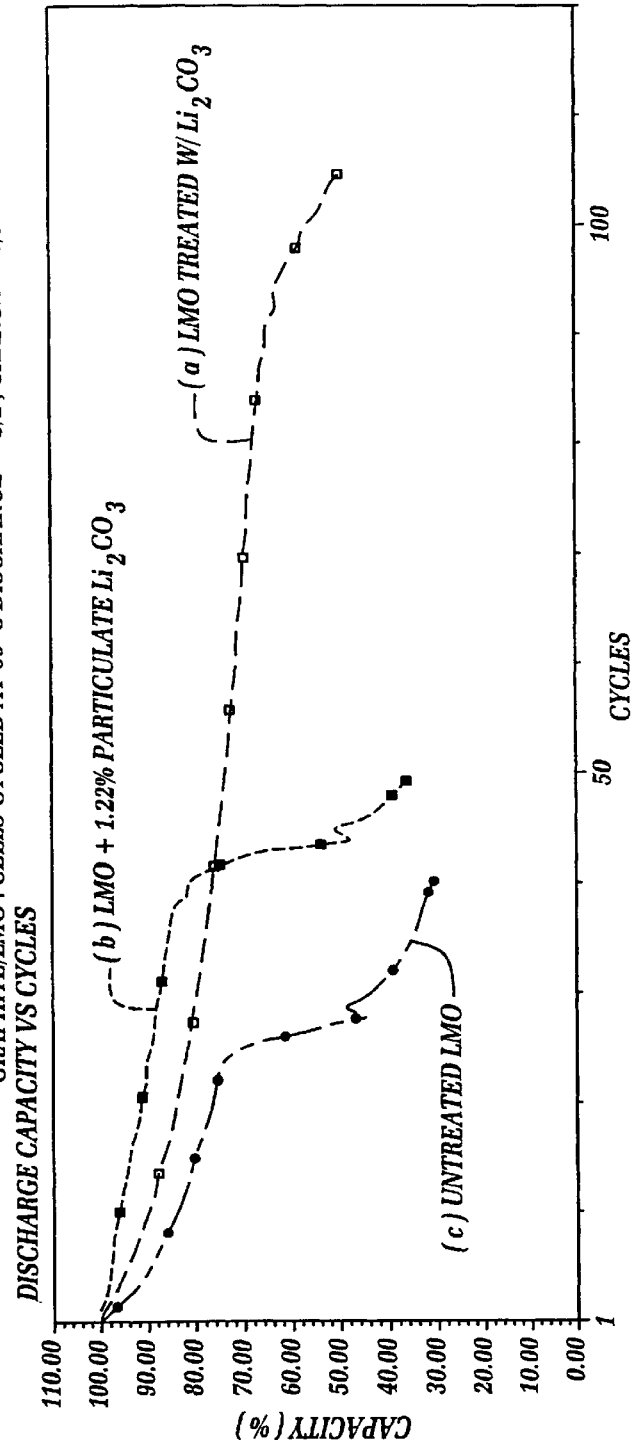

Cells prepared in accordance with the invention were also compared to cells where the cathode active material was untreated LMO, the same as the "before" condition shown in Table 1, and without any particulate lithium carbonate added to the cathode. This comparative cell had the lithium manganese oxide positive electrode active material in an untreated condition and the MCMB counter electrode. The cells were otherwise prepared as described in the Examples. These cells were cycled under the same conditions as per the Examples except that the charge rate at C/5 was slightly different. These cells cycled for only up to 40 cycles and demonstrate a capacity loss on the order of 70%, retaining only about 30% of their original capacity for up to about 40 cycles. See FIG. 5, plot (c) labeled untreated LMO.

Further cells were prepared using untreated LMO, that is, LMO in the "before" condition as shown in Table 1, but also including particles of lithium carbonate in the cathode formulation. On the basis of 100 parts by weight of total active material, the particulate lithium carbonate constituted about 1.22 weight percent and the untreated lithium manganese oxide the balance. These cells were only able to cycle up to 50 cycles. At about 50 cycles, the cells retained only about 40% of their original capacity. The cycling conditions for all of the aforesaid comparative cells were at 23° C. versus the graphite anode at two hour discharge and five hour charge rate. See FIG. 5, plot (b) labeled LMO+ particulate $Li_2CO_3$.

Still further cells were prepared with LMO heat treated with lithium carbonate at a temperature of about 500° C. and up to 800° C., and typically 600° C. to 750° C. This heat treatment is at a temperature much greater than the 300° C. to up to 500° C., and typically 400° C., used with the lithium containing compound of the present invention. The results for cells prepared with lithium manganese oxide heat treated with lithium carbonate are labeled as plot (a) in FIG. 5. These cells lost more capacity than the cells heat treated with the preferred lithium hydroxide of the invention.

Based on the comparative cells, there is a dramatic difference and improvement when lithium manganese oxide is heat treated with lithium hydroxide. Still further improvement is obtained by adding particles of lithium carbonate to the treated lithium manganese oxide active material when forming a cathode. The comparative cells demonstrated that untreated lithium manganese oxide, when combined with particles of lithium carbonate to form a cathode formulation, is not sufficient to achieve the magnitude of improvement of the present invention.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method of treating spinel lithium manganese oxide particles which comprises the steps of (a) forming a mixture comprising said lithium manganese oxide particles and lithium hydroxide; and (b) heating said mixture for a time and at a temperature sufficient to decompose said lithium hydroxide, to provide treated spinel lithium manganese oxide characterized by reduced surface area and increased lithium content as compared to untreated spinel lithium manganese oxide, wherein the untreated spinel lithium manganese oxide of step (a) is represented by the formula $Li_{1+x}Mn_{2-x}O_4$; and wherein said treated spinel having increased lithium content is represented by the formula $Li_{1+y}Mn_{2-y}O_4$, where $0<x<y\leq0.20$.

2. A method according to claim 1, wherein x is less than or equal about 0.08.

3. The method of claim 1 wherein the lithium hydroxide is in particle form in step (a).

4. The method of claim 1 wherein said heating step (b) is conducted in an air atmosphere.

5. The method of claim 1 wherein said heating is conducted at a temperature in a range of about 300 to about 450° C.

6. The method of claim 1 wherein said heating is conducted for a time of about 10 minutes to about 5 hours.

7. The method of claim 1 wherein the lithium hydroxide contained in the mixture of step (a) is present in an amount of up to about 10 percent by weight of the total mixture.

8. The method of claim 1 wherein the lithium hydroxide contained in the mixture of step (a) is present in an amount of up to about 5 percent by weight of the total mixture.

9. The method of claim 1 wherein the amount of lithium hydroxide is one to two percent by weight of the total mixture.

10. A method of treating spinel lithium manganese oxide particles which comprises the steps of (a) forming a mixture comprising said lithium manganese oxide particles and lithium hydroxide; and (b) heating said mixture for a time and at a temperature sufficient to decompose said lithium hydroxide, to provide treated spinel lithium manganese oxide characterized by reduced surface area and increased lithium content as compared to untreated spinel lithium manganese oxide, wherein the untreated spinel lithium manganese oxide of step (a) is represented by the formula $Li_{1+x}Mn_{2-x}O_4$; and wherein said treated spinel having increased lithium content is represented by the formula $Li_{1+y}Mn_{2-y}O_4$, where $0<x<y\leq 0.20$.

11. A method for treating spinel lithiated manganese oxide particles, comprising the steps of:
(a) forming a mixture comprising the spinel particles and particles of a lithium containing compound selected from the group consisting of lithium hydroxide, lithium acetate, lithium oxalate, lithium formate, lithium tartrate, and mixtures thereof, wherein the particles of the lithium containing compound comprise from about 0.1 weight percent to about 10 weight percent of the mixture, and wherein the spinel particles have formula $$Li_{1+x}Mn_{2-x}O_4$$

wherein $0<x\leq 0.08$; and
(b) heating the mixture for a time and at a temperature sufficient to form a reaction product characterized by general formula $$Li_{1+y}Mn_{2-y}O_4$$

wherein $0<x<y\leq 0.5$.

12. A method according to claim 11, wherein y is less than or equal about 0.2.

13. A method according to claim 11, wherein x is greater than about 0.02.

14. A method according to claim 11, wherein the temperature of heating is up to about 500° C.

15. A method according to claim 11, wherein the temperature of heating is up to about 450° C.

16. A method according to claim 11, wherein the lithium containing compound comprises from about 0.2 to about 5.0 weight percent of the particles.

17. A method according to claim 11, wherein the lithium containing compound comprises from about 1 to about 2 weight percent of the particles.

18. A method according to claim 11, wherein the heating step is conducted in air.

19. A method according to claim 11, wherein the lithium containing compound comprises lithium hydroxide.

20. A method according to claim 19, wherein the temperature of heating is from about 300° C. to about 450° C.

21. A method according to claim 11, wherein x is greater than about 0.02 and y is less than or equal to about 0.2.

22. A method according to claim 11, wherein the lithium containing compound comprises at least one compound selected from the group consisting of lithium acetate, lithium oxalate, lithium formate, and lithium tartrate.

* * * * *